United States Patent
Patil et al.

(10) Patent No.: US 7,560,522 B2
(45) Date of Patent: Jul. 14, 2009

(54) INCLUSION COMPLEXES OF UNSATURATED MONOMERS, THEIR POLYMERS AND PROCESS FOR PREPARATION THEREOF

(75) Inventors: Prerana Maruti Patil, Pune (IN); Mohan Gopalkrishna Kulkarni, Pune (IN)

(73) Assignee: Council of Scientific and Industrial Research (IN)

( * ) Notice: Subject to any disclaimer, the term of this patent is extended or adjusted under 35 U.S.C. 154(b) by 0 days.

(21) Appl. No.: 11/801,238

(22) Filed: May 8, 2007

(65) Prior Publication Data

US 2007/0213489 A1    Sep. 13, 2007

Related U.S. Application Data

(62) Division of application No. 10/976,513, filed on Oct. 29, 2004, now abandoned.

(51) Int. Cl.
C08F 2/44 (2006.01)
C08B 37/16 (2006.01)

(52) U.S. Cl. .......... 526/200; 526/238.2; 524/48

(58) Field of Classification Search .......... 524/48; 526/200, 238.2; 522/78, 79, 84
See application file for complete search history.

(56) References Cited

U.S. PATENT DOCUMENTS

| | | | |
|---|---|---|---|
| 5,521,266 A * | 5/1996 | Lau | 526/200 |
| 6,229,062 B1 * | 5/2001 | Mandell et al. | 604/367 |
| 2003/0130416 A1 * | 7/2003 | Flosbach et al. | 524/801 |
| 2005/0032995 A1 * | 2/2005 | Kulkarni et al. | 526/219.6 |
| 2005/0096443 A1 * | 5/2005 | Kulkarni et al. | 526/303.1 |
| 2006/0094844 A1 | 5/2006 | Patil et al. | 526/225 |
| 2007/0213470 A1 | 9/2007 | Patil et al. | 525/387 |
| 2007/0213486 A1 | 9/2007 | Patil et al. | 526/219.3 |

FOREIGN PATENT DOCUMENTS

DE     199 56 326 A1 *   5/2001

OTHER PUBLICATIONS

Ch. Schneider, et al., "On the Inclusion Coopolymerization of some Vinyl and Diene Monomers in Different Types of Matrices", Die Angewandte Makromolekulare Chemie, 145/146 (1986) pp. 19-35.
Sunita S. Satav, et al., "Hydrogen Bonding In Trivinyl Monomers: Implications for Inclusion Complexation and Polymerization", Macromolecules (2007) 40, pp. 1824-1830.

* cited by examiner

*Primary Examiner*—Helen L. Pezzuto
(74) *Attorney, Agent, or Firm*—Ostrolenk, Faber, Gerb & Soffen, LLP

(57) ABSTRACT

The present invention describes water-soluble homopolymers obtained by polymerization of monomers containing multiple unsaturations. These monomers form inclusion complexes with cyclodextrins and methylated cyclodextrins. The unsaturated site involved in the formation of the inclusion complex does not take part in the polymerization reaction. After cyclodextrin is recovered, the polymer containing multiple unsaturations can be further polymerized either by thermal and/or photochemical initiators to yield crosslinked polymers.

3 Claims, No Drawings

INCLUSION COMPLEXES OF UNSATURATED MONOMERS, THEIR POLYMERS AND PROCESS FOR PREPARATION THEREOF

CROSS REFERENCE TO RELATED APPLICATIONS

The present application is a divisional of U.S. patent application Ser. No. 10/976,513, abandoned, filed Oct. 29, 2004, the entire contents of which is hereby incorporated by reference.

FIELD OF THE INVENTION

The present invention relates to inclusion complexes of unsaturated monomers their polymers and process for preparation thereof. Specifically, the present invention relates to water soluble polymers containing unsaturated sites, which can be subsequently crosslinked in the presence of thermal/or photochemical initiators. These polymers are obtained by the selective polymerization of the inclusion complexes comprising monomers containing multiple unsaturation sites and cyclic macromolecular organic compounds such as cyclodextrins. More particularly, it relates to the complexes of alpha, beta, hydroxypropyl and methylated cyclodextrin and acrylamide/methacrylamide monomers containing multiple unsaturation sites and their polymerization, which results in soluble polymers containing free unsaturation sites for further modifications.

These polymers have applications in different fields like immobilization of enzymes, controlled drug delivery systems, sensors, etc.

BACKGROUND OF THE INVENTION

Traditionally, polymers have been classified into two categories viz thermoplastics and thermosets depending upon their melting and solubility behavior. The thermoplastics on heating, are converted to a molten state and on cooling return to solid state reversibly. This property is made use of in shaping the polymers in various forms such as films, sheets, rods and other molded products. Also, these polymers are soluble in solvents and can be converted into films by solution casting and solvent evaporation. In contrast, the thermoset products cannot be converted into a molten state or dissolved in solvents reversibly. Although, these materials offer enhanced mechanical and thermal properties over the thermoplastics, they cannot be readily processed into finished products using processing techniques, commonly used in the case of thermoplastics. Similarly, the properties of the thermoplastics cannot be significantly enhanced after converting the resins into finished products since there is no scope to modify the polymer structure chemically after the polymerization is completed.

In few cases such as the phenolics, ureas and melamines, a two stage process is adopted whereby polymerization is first limited to a stage where the polymer can be fused into a molten state or dissolved in a solvent and then cross linked further into an infusible, insoluble product which has enhanced mechanical and thermal properties.

Thermosetting polymers containing reactive groups are used as coatings. These polymers are usually in the form of lattices that are further crosslinked either thermally or by addition of functional groups like isocyanates, amines or metal ions. By formation of a network, these resins attain their desired properties i.e., insolubility in most organic solvents, good water resistance and hardness (Van E. S. J. J. in *Polymeric Dispersions: Principles and Applications*. Asua, J. M. (Ed), Kluwer Publishers, 1997, p. 451; Ooka, M., Ozawa, H. *Progress in Organic Coatings*. Vol 23, 1994, p. 325). Photosensitive groups like cinnamoyl or azo type do not undergo thermal free radical polymerization but can be polymerized by UV irradiation. Polymers containing these functional groups can be cured by exposure to UV irradiation (Mueller, H., Mueller, I., Nuyken, O. Strohriegl P. Makromolecular Chemistry Rapid Communications, 13, 289, 1992; Raanby, B in Current Trends in Polymer Photochemistry. Norman, Allen (Ed), London, UK, 1995, p. 23). These materials can be used for non-linear optics.

In the case of unsaturated polyester resins, a polyester resin containing unsaturated sites is prepared by condensation polymerization using maleic anhydride and/or fumaric acid as the acid component. The resin, diluted with other vinyl monomers such as styrene, methyl methacrylate, allyl acrylate, etc. is cast into the desired form and then polymerized further to a crosslinked product in the presence of free radical initiators and accelerators/activators. While these resins are routinely used in the electrical and automobile industry, their scope is restricted. A large number of monomers such as styrene, methyl methacrylate, acrylonitrile, vinyl acetate, hydroxyethyl methacrylate, acrylamide and so on when polymerized by conventional methods of free radical polymerization result in solvent soluble melt fusible resins, which can be then converted to desired products. But as mentioned earlier, these products cannot be subsequently transformed into insoluble, infusible products, since there are no potential polymerizable sites present in the structure. On the other hand, copolymerization of these monomers with monomers containing multiple unsaturated sites viz Methylene bis acrylamide, Ethylene bis methacrylamide, Phenylene bis methacrylamide, ethylene glycol dimethacrylate, divinyl benzene, allyl acrylate, vinyl methacrylate results in the formation of three dimensional crosslinked products which cannot be further converted into useful forms since they are neither soluble in solvents nor be they can converted into a molten state on the application of heat.

Free radical polymerization of monomers comprising multiple unsaturated groups leads to insoluble polymers. There are few reports on the controlled polymerization of monomers containing multiple unsaturated groups using anionic polymerization. Thus, anionic polymerization of 1,4 divinyl or 1,4-diisopropenylbenzene led to reactive microgels containing pendant vinyl groups. But this method is restricted to divinyl compounds, which are amenable to anionic polymerization (Hiller, J. C., Funke, W. Angew Makromol. Chem., 76/77, 161, 1979. Wolfgang, S., Funke, W. Makromolecular Chemie, 179, 2145, 1978) and requires monomers of extremely high purity and very low temperatures for synthesis.

Recently Guan (Guan, Z. J. Am. Chem. Soc. 124, 5616, 2002), reported the synthesis of hyper branched polymers by cobalt mediated free radical polymerization of ethylene glycol dimethacrylate which resulted in a soluble poly (ethylene glycol dimethacrylate) polymer containing unsaturation. However, this method is specific to ethylene glycol dimethacrylate and cannot be readily extended to other monomers containing multiple unsaturated sites or to copolymers.

A wide range of cyclic compounds such as cyclodextrins, calixarenes, cryptands, and crown ethers are known to form host guest complexes and have been widely exploited commercially e.g. a number of drugs which are poorly water soluble and hence are poorly absorbed in the body have been encapsulated in the cyclodextrin cavity. The enhanced solubility leads to enhanced bioavailability of the drug. Crown ethers are macrocyclic polyether ring systems consisting of a number of oxygen joined by ethylene bridges. Crown ethers of 18-crown-6 type contain a cavity, which is able to form inclusion complexes with potassium, ammonium and protonated primary amines. The direct optical resolution of a number of di and tripeptides was achieved by capillary zone electrophoresis using enantioselective crown ether as buffer additive. (R. Kuhn, R. Daniel, F. Burkhard, W. Kart-Heinz. J. of Chromatography A, 716, 371-379, 1995). Chiral crown ethers are used to resolve enantiomers that contain primary amine functional groups. (D. W. Armstrong, L. W. Chang, S. S. C. Chang, J. of Chromatography A, 793, 115-134, 1998). Similarly, bis-tren cryptates represent a versatile class of receptors for anions both mono and poly atomic. They can impart selective affinity towards a variety of anions. (V. Amendola, L. Fabbrizzi, C. Mangano, P. Pallavicini, A. Poggi, A. Taglietti, Coordination chemistry, 219-221, 821-837, 2001). The potential of calixarenes as artificial receptors and sensors for biomolecules has long been recognized. Calixarenes owe their utility to their ability to act as host compounds, forming host-guest complexes in solution/(Lumetta, G. J.; Rogers, R. D.; Gopalan, A. S. 'Calixarenes for separations, American chemical society: Washington, D.C. 2000). The selectivity for smaller alkali metals has led to their studies as sensor devices. (Rusin, O.; Kral, V. Sens. Actuators B, B76, 331-335, 2001 and Diamond, D.; Nolan, K. Anal. Chem., 73, 22A-29A, 2001).

Cyclodextrins are well known cyclic oligosaccharides that can solubilize hydrophobic compounds in aqueous media. (Wenz, G. Angew Chem. 106, 851, 1994). The solubilization is effected by complexation of the water insoluble species within the hydrophobic cavity of cyclodextrin. The use of cyclodextrin to dissolve suitable monomers in water has been described in the literature (Storsberg J., Ritter, H. Macromolecular Rapid Communications 21, 236, 2000, Jeromin, J., Ritter, H. Macromolecular Rapid Communications 19, 377, 1998, Jeromin, J., Noll, O., Ritter, H. Macromolecular Chemistry and Physics 199, 2641, 1998, Glockner, P., Ritter, H. Macromolecular Rapid Communications 20, 602, 1999). Some patents describe the use of cyclodextrin preferably in catalytic amounts in order to improve emulsion polymerization yields. (U.S. Pat. Nos. 6,225,299, 5,521,266).

The copolymerization of several N-alkyl methacrylamides with t-butyl methacrylate in water in the presence of methylated-β-cyclodextrin is described. (Ritter H., Schwarz-Barac S. and Stein P., Macromolecules, 36 (2), 318-322, 2003). Methylated β-CD was used to complex the hydrophobic monomers isobornyl acrylate and butyl acrylate yielding water soluble host/guest complexes. These inclusion complexes of monomers were polymerized in water and kinetics of polymerization was investigated. It was found that reactivity ratios of complexed monomer differ significantly from uncomplexed monomers and also molecular weight of polymers obtained from complexed monomers are higher than those obtained from uncomplexed monomers. (Glockner P., Ritter H., Macromol. Rap. Comm., 20(11), 602-605, 1999). The free radical polymerization of styrene or MMA in water with potassium peroxodisulfate as free radical initiator in the presence of randomly methylated β-cyclodextrin is described. This method gives the quantitative conversion of the monomers and leads to stable latexes with nearly monodisperse polymer particle size distribution without using any surfactant (Storsberg J., van Aert H., van Roost C. and Ritter H., Macromolecules, 36, 50-53, 2003). Hydrophobic methacrylic monomers such as t-butyl methacrylate, cyclohexyl methacrylate, and 2-ethyl hexyl methacrylate were complexed with methylated β-cyclodextrin. These complexes were polymerized in aqueous media using free radical initiation. (Madison P. and Long T., Biomacromolecules, 1, 615-621, 2000). Highly hydrophobic monomers cannot be readily incorporated by emulsion polymerization. The use of a catalytic level of cyclodextrin allows the use of very hydrophobic monomers in emulsion polymerization where cyclodextrin acts as a phase transport catalyst continuously complexing and solubilizing the hydrophobic monomers and releasing them to the polymer particles. (Lau W., Macromol. Symp. 182, 283-289, 2000) Free radical polymerization of complexes of N-methacryloyl-D, L-phenylalanine methyl ester derivatives focusing on enantiodiscrimination during polymerization in an aqueous medium is described. (Schwarz-Barac S., Ritter H., Schollmeyer D., Macromol. Rap. Comm., 24(4), 325-330, 2003). Emulsion polymerization of stearyl acrylate was carried out using cyclodextrin as a phase transfer agent. (Leyrer R., Machtle W., Macromol. Chem. Phy., 201, 1235-1243, 2000). The first example of the radical polymerization of a fluorinated 2-vinyl cyclopropane and its copolymerization with an alkyl 2-vinyl cyclopropane in an aqueous solution via their host-guest complexation with a randomly methylated β-cyclodextrin using a water soluble initiator 2,2' azobis (2-amidinopropane) dihydrochloride is reported. (Choi S. W., Kretschmann O., Ritter H., Ragnoli M., Galli G., Macromol. Chem. Phys., 204, 1475-79, 2003). Methylated β-cyclodextrin was used to complex the hydrophobic monomers n-butyl acrylate, n-hexyl acrylate, cyclohexyl acrylate yielding the corresponding water soluble host/guest complexes. The copolymerization of uncomplexed monomers leads to nearly ideal statistical copolymers (Bernhardt S., Glockner P., Ritter H., Polymer bulletin, 46, 153-157, 2001). The polymerization mechanism of methylated β-cyclodextrin complexes of phenyl methacrylate and cyclohexyl methacrylate is described by Jeromin and Ritter. (Jeromin J., Ritter H., Macromol. Rap. Comm., 19, 377-379, 1998).

A survey of the prior art in the field of polymerization of complexes containing cyclodextrins reveals that the preparation of host-guest complexes comprising monomers containing multiple unsaturation and cyclic compounds has not been reported till date. It has been found that monomers which contain multiple unsaturation form inclusion complexes of varying stoichiometries with cyclodextrins. Further, the unsaturated sites encapsulated within the cyclodextrin cavity do not react with the growing free radical chain. The polymerization of inclusion complexes of vinyl monomers containing multiple unsaturation, therefore leads to soluble polymers containing unreacted unsaturated sites. Once cyclodextrin is removed from the system, the deprotected unsaturated site can participate in polymerization in the second stage and lead to crosslinked products having enhanced mechanical, thermal and solvent resistance characteristics. These polymers therefore, offer the ease of processing of thermoplastics and enhanced properties of thermosets.

Cyclodextrin has been used in the present invention not only for the dissolution of monomers in water; but also to prevent one of the unsaturation sites present in the crosslinker from taking part in polymerization. Physical interactions are always preferred over chemical modifications as these are readily reversible. The inclusion complexes of hydrophobic/hydrophilic crosslinkers have several advantages over the complexes of the monomers containing only one unsaturation. These inclusion complexes increase the solubility of the monomer and can be used for copolymerization with different monomers giving soluble polymers. The unsaturation sites present after polymerization can further be thermally/ photochemically crosslinked to give insoluble polymers. Also, the method can be used to prepare polymers of different architectures.

The demand for environmentally benign processes is growing due to increasing awareness of environmental issues involving conventional organic solvents. The chemical industry is encouraged to look for new means to the same end for many of its traditional processes that either produce environmentally unfriendly industrial products or result in toxic by-products. In an effort to overcome such potential obstacles with minimal expense, research is directed towards the replacement of traditional organic solvents with environmentally benign compounds such as carbon dioxide, biomolecules, and water. Complexation with carbohydrate monomers increases the solubility of hydrophobic monomers and enables its polymerization in aqueous medium. These carbohydrates can be easily recycled after polymerization. In our copending application patent no. PCT/IB03/03593 cyclodextrin complexes with acrylates/methacrylates have been mentioned which have little solubility in water. Since these complexes are hydrophobic they are normally not suitable to synthesize water-soluble polymers. Hence, there is a need to synthesize complexes comprising hydrophilic crosslinkers, which can be copolymerized with hydrophilic as well as hydrophobic monomers.

Typical water-soluble crosslinkers are Methylene bis acrylamide (MBAM), Ethylene bis methacrylamide (EBMA) or Phenylene bis methacrylamide. These crosslinkers have widespread applications. MBAM improves the stability of the membrane in an oxidative environment, which shows that MBAM crosslinked styrene membrane should work well in a fuel cell environment (Becker, W.; Schmidt-Naake, G., Chemical Engg. and Technology, 25 (4) 373-377, 2002). Interpenetrating network of methacrylamide and MBAM is used for selectivity in ion sorption i.e $Fe^{2+}$ sorption and $Cr^{6+}$ rejection. (Chauhan, G. S.; Mahajan, S., J. Appl. Poly. Sc., 86(31), 667-671, 2002). Superabsorbents made from Poly (Acrylamide-co-2-hydroxymethyl acrylate) in the presence of MBAM and potassium methacrylate are used for water managing materials for agriculture and horticulture purposes as it retains more moisture for longer time. (Raju, K. M.; Raju, M. P.; Mohan, Y. M., J. Appl. Poly. Sc., 85(8), 1795-1801, 2002). Poly (2-Acrylamido methyl propane sulphonic acid) prepared in the presence of MBAM and benzophenone was found suitable for MIP membrane synthesis. (Piletsky, S. A.; Matuschewski, H.; Schedler, U.; Wilpert, A.; Piletska, E. V.; Thiele, T. A.; Ulbricht, Macromolecules, 33(8), 3092-98, 2000). Also, thermally stable water swollen gels are used for fluid diversion in petroleum production. (Suda, Makoto; Kurata, Tooru; Fukai, Toshihiro; Maeda, Kenichiro, J. Pet. Sci Eng., 26 (1-4), 1-10, 2000). When Polyacrylamide gels are prepared in the presence of MBAM, Ethylene glycol dimethacrylate, 1,4 butanediol diacrylate/diallyl phthalate, more water absorbency was observed when MBAM was used as a crosslinking agent. (Raju, K. Mohana; Raju, M. Padmanabha; Mohan, Y. Murali, Polymer International, 52(5), 768-72, 2003).

Water soluble monomers such as acrylamide, acrylic acid or N-vinyl pyrrolidone are normally used in the presence of crosslinkers for immobilization of enzymes. Poly (acrylic acid) prepared in the presence of a MBAM, benzyldimethyl ketal pyrrolidone carboxylic acid is used as bioelectrodes with low impedance between electrode and skin. (JP 09038057 and JP 09038057). Poly (acrylamide-co-N acryloyl para amino benzamidine) synthesized in the presence of MBAM is used as molecularly imprinted polymeric receptor for trypsin. (Vaidya A. A.; Lele, B. S.; Kulkarni, M. G.; Mashelkar, R. A. J. App. Poly. Sc., 81(5), 1075-83, 2001). Poly (NIPA-co-MBAM) can be used to detect HBV viruses and for the concentration of either nucleic acids/proteins. (Pichot, C.; Elaisari, A.; Duracher, D.; Meunier, F.; Sauzedde, F. Macromol. Symposia, 175, 285-397, 2001). Poly (NIPA-co-AA) hydrogel prepared in the presence of MBAM is used for concentrating aqueous dispersions of bacteria. (Champ, S.; Xue, W.; Huglin, M. B. Macromol. Chem. and Phys., 201(17), 2505-2509, 2000). Poly (Acrylamide-co-Na acrylate) synthesized in the presence of MBAM is found to be useful for immobilization of *Saccharomyces cerevisiae* enzyme. (Oztop, H. N.; Oztop, A. Y.; Karadag, E.; Isikver, Y.; Saraydin, D., Enzyme and Microbial Technology, 32(1), 114-119, 2003). Poly (NIPA-co-HEMA) prepared in the presence of MBAM is used in enzyme activity control, extraction and drug delivery systems. (Lee, W. F.; Huang, Y.L. J. App. Poly. Sc., 77(8), 1769-1781, 2000). However, in all these cases, the unreacted crosslinker, which is toxic, is difficult to remove from these swollen gels. (George D. J., Price J. C., Marr C. M., Myers B. C., Schwetz A. B. and Heindel J. J. Toxicological science 46(1), 1998, 124-133). Hence, if a polymer comprising MBAM be prepared, freed from unreacted MBAM, then crosslinked, thus will overcome one of the limitations of these polymers in intended applications. It is the objective of this invention to demonstrate synthesis of such polymers.

OBJECT OF THE INVENTION

The object of this invention is to provide inclusion complexes of unsaturated monomers, their polymers and process for preparation thereof. More particularly, it relates to synthesis of soluble polymers containing free unsaturated sites by the polymerization of the inclusion complexes comprising cyclic macromolecular compounds and monomers comprising multiple unsaturated sites.

SUMMARY OF THE INVENTION

Accordingly, the present invention provides inclusion complexes comprising monomers containing multiple unsaturations and cyclic compound, the complexes having the formula A(x)B(y), wherein 'A' is a monomer containing 'x' number of vinyl unsaturations wherein 0<x<3 and B is the cyclic host molecule comprising 'y' units, wherein 5<y<7.

In one embodiment of the invention, the monomer containing multiple unsaturations is an aliphatic, aromatic or heterocyclic compound.

In another embodiment of the invention, the monomer is bis acrylamide/methacrylamide, such as Ethylene bis acrylamide/Ethylene bis methacrylamide, Methylene bis acrylamide/Methylene bis methacrylamide, Propylene bis acrylamide/Propylene bis methacrylamide, Butylene bis acrylamide/Butylene bis methacrylamide, Phenylene bis acrylamide/Phenylene bis methacrylamide, Tris (2-methacrylamido ethyl) amine/Tris (2-acrylamido ethyl) amine, 2,4,6-Trimethacrylamido-1,3,5-triazine/2,4,6-Tri acrylamido-1,3,5-triazine, N,N'-(4,7,10-trioxa tridecamethylene)-bis acrylamide/N, N'-(4,7,10-trioxa tridecamethylene)-bis methacrylamide, N,N'-(4,9-dioxa dodecamethylene)-bis acrylamide/N,N'-(4,9-dioxa dodecamethylene)-bis methacrylamide, 2,4,5,6 tetra-methacrylamido pyrimidine sulfate/2,4,5,6 tetra-acrylamido pyrimidine sulfate, 4,5,6 tris acrylamido pyrimidine sulfate/4,5 6 tris methacrylamido pyrimidine sulfate.

In another embodiment of the invention, the preferred monomers containing multiple unsaturations are Methylene bis acrylamide and Ethylene bis methacrylamide.

In another embodiment of the invention, the cyclic compound is a macromolecular organic compound exemplified by cyclodextrins, crown ethers, cryptands, cyclophanes or their derivatives.

In another embodiment of the invention, the preferred cyclic compound is cyclodextrin.

In another embodiment of the invention, the preferred cyclic compound, cyclodextrin is alpha, beta, hydroxypropyl or methylated derivative.

In another embodiment of the invention, wherein the representative complexes of the comprise:
i) β-Cyclodextrin-Ethylene bis methacrylamide (EBMA) complex
ii) β-Cyclodextrin-Methylene bis acrylamide (MBAM) complex
iii) methylated β-cyclodextrin-Ethylene bis methacrylamide (EBMA) complex
iv) α-Cyclodextrin-Ethylene bis methacrylamide complex
v) α-Cyclodextrin-Methylene bis acrylamide (MBAM) complex
vi) methylated β-Cyclodextrin-Methylene bis acrylamide (MBAM) complex
vii) hydroxypropyl β-Cyclodextrin-Methylene bis acrylamide complex The present invention also provides a process for the preparation of inclusion complexes comprising monomers containing multiple unsaturations and cyclic compound, the complexes having the formula A(x)B(y), wherein 'A' is a monomer containing 'x' number of vinyl unsaturations wherein $0<x<3$ and B is the cyclic host molecule comprising 'y' units, wherein $5<y<7$, which comprises dissolving a cyclic compound or its derivatives in a solvent at room temperature, adding a stoichiometric amount of a monomer containing multiple unsaturations and stirring the mixture up to 24-48 hours at temperature in the range 20° C. to 30° C., evaporating the solvent and recovering the complex under vacuum to obtain the inclusion complex.

In one embodiment of the invention, the cyclic compound is a macromolecular organic compound exemplified by cyclodextrins, crown ethers, cryptands, cyclophanes or their derivatives In another embodiment of the invention, the solvent used for inclusion complex preparation is water or halogenated hydrocarbons.

In another embodiment of the invention, the halogenated solvents used for inclusion complex are dichloromethane, chloroform and carbon tetrachloride.

In another embodiment of the invention, the preferred halogenated solvent used for inclusion complex is chloroform.

In another embodiment of the invention, the solvent used for inclusion complex is water.

The present invention also relates to a polymer prepared by the polymerization of the inclusion complexes described above and having composition [A(x) B(y)]n, wherein x=0 to 10, y=0 to 10 and n=10 to 1000.

In another embodiment of the invention, wherein the polymers contain pendent unsaturations and are soluble in organic solvents and water.

The present invention also relates to a process for the preparation of polymers having composition [A(x) B(y)]n, wherein x=0 to 10, y=0 to 10 and n=10 to 1000, which comprises dissolution of the inclusion complex in a solvent, adding initiator and polymerizing by thermal, redox or photopolymerization method.

In another embodiment of the invention, wherein the inclusion complex is subjected to free radical polymerization.

In another embodiment of the invention, wherein the inclusion complex is subjected to solution polymerization.

In another embodiment of the invention, wherein the solvents used for solution polymerization are organic solvents.

In another embodiment of the invention, wherein the organic solvents used for polymerization of inclusion complexes are N,N' dimethyl formamide, N,N' dimethyl acetamide, N,N' dimethyl sulphoxide, chloroform.

In another embodiment of the invention, wherein the preferred organic solvent are N, N' dimethyl formamide and chloroform.

In another embodiment of the invention, wherein the solvent used for polymerization of inclusion complexes is water.

In another embodiment of the invention, wherein the solvent used for precipitation polymerization is chloroform.

In another embodiment of the invention, wherein the initiator is thermal, redox or photoinitiator.

In another embodiment of the invention, wherein the thermal initiators used for polymerization are water soluble or oil soluble.

In another embodiment of the invention, wherein the water soluble thermal initiators are potassium persulphate, ammonium persulphate, 2,2' azo bis(2-amidino propane) dihydrochloride, azo bis cyano valeric acid.

In another embodiment of the invention, wherein the preferred water soluble thermal initiators are potassium persulphate and 2,2' azo bis(2-amidino propane)dihydrochloride.

In another embodiment of the invention, wherein oil soluble thermal initiators are azo bis isobutyro nitrile, benzoyl peroxide, t-butyl peroxide, cumyl peroxide, 1,1' azobis cyclohexane carbonitrile.

In another embodiment of the invention, wherein the preferred oil soluble thermal initiator is azo bis isobutyro nitrile.

In another embodiment of the invention, wherein the redox initiators are sodium sulphite—potassium persulphate, sodium metabisulphite—potassium persulphate.

In another embodiment of the invention, wherein the preferred redox initiator is sodium metabisulphite—potassium persulphate.

In another embodiment of the invention, wherein the photoinitiator used for the polymerization are either water soluble or oil soluble.

In another embodiment of the invention, wherein the water soluble photoinitiators are 2,2' azo bis(2-amidino propane) dihydrochloride, azo bis cyano valeric acid.

In another embodiment of the invention, wherein the preferred water soluble photoinitiator is 2,2' azo bis(2-amidino propane)dihydrochloride.

In another embodiment of the invention, wherein the oil soluble photoinitiators are 2-hydroxy cyclohexyl phenyl ketone, 2,2'-azobis(2,4-dimethyl valeronitirle), 2,2'-azobis (2-methyl butyronitrile).

In another embodiment of the invention, wherein the preferred oil soluble photoinitiator is 2-hydroxy cyclohexyl phenyl ketone.

In another embodiment of the invention, wherein the temperature for the polymerization is from 20° C. to 65° C.

In another embodiment of the invention, wherein the polymerization of the inclusion complexes is carried out at 25° C. in the presence of potassium persulphate and TEMED.

The present invention also provides a process for the preparation of crosslinked polymers from polymers having composition [A(x) B(y)]n, wherein x=0 to 10, y=0 to 10 and n=10 to 1000, by free radical polymerization method.

In one embodiment of the invention, wherein the organic solvents used are N,N' dimethyl formamide, N,N' dimethyl acetamide, N,N' dimethyl sulphoxide.

In another embodiment of the invention, wherein the preferred organic solvent is N, N' dimethyl formamide.

In another embodiment of the invention, wherein the solvent used for crosslinking is water.

In another embodiment of the invention, wherein the initiator is thermal or photoinitiator.

In another embodiment of the invention, wherein the thermal initiators used for polymerization are water soluble or oil soluble.

In another embodiment of the invention, wherein water soluble thermal initiators are potassium persulphate, ammonium persulphate, 2,2' azo bis(2-amidino propane)dihydrochloride, azo bis cyano valeric acid.

In another embodiment of the invention, wherein the preferred water soluble thermal initiators are potassium persulphate and 2,2' azo bis(2-amidino propane)dihydrochloride.

In another embodiment of the invention, wherein the oil soluble thermal initiators are azo bis isobutyro nitrile, benzoyl peroxide, t-butyl peroxide, and cumyl peroxide.

In another embodiment of the invention, wherein the preferred oil soluble thermal initiator is azo bis isobutyro nitrile.

In another embodiment of the invention, wherein the photoinitiator used for the polymerization are either water soluble or oil soluble.

In another embodiment of the invention, wherein the water soluble photoinitiators are 2,2' azo bis(2-amidino propane) dihydrochloride, azo bis cyano valeric acid.

In another embodiment of the invention, wherein the preferred water soluble photoinitiator is 2,2' azo bis(2 -amidino propane)dihydrochloride.

In another embodiment of the invention, wherein the oil soluble photoinitiators are 2-hydroxy cyclohexyl phenyl ketone, 2,2'-azobis(2,4-dimethyl valeronitirle), 2,2'-azobis (2-methyl butyronitrile).

In another embodiment of the invention, wherein the preferred oil soluble photoinitiator is 2-hydroxy cyclohexyl phenyl ketone.

In another embodiment of the invention, wherein the temperature for the polymerization is from 20° C. to 65° C.

DETAILED DESCRIPTION OF THE INVENTION

This invention describes hydrophilic polymers comprising multiple unsaturations. The monomers containing multiple vinyl unsaturations, which can be used in the synthesis of these polymers, are exemplified by Methylene bis acrylamide, Ethylene bis methacrylamide. The polymerization reactions can be carried out in aqueous media rather than in organic polar solvents like dimethyl formamide and/or dimethyl sulphoxide described in the previous application PCT/IB03/03593. Further, the crosslinkers used are hydrophilic and are essentially water soluble. Thus, the present invention describes a method of preparing inclusion complexes comprising cyclodextrin and crosslinkers containing multiple unsaturation sites. The inclusion complexes so formed are polymerized along with other monomers soluble in aqueous media and isolated. The isolated products contain multiple unsaturations since only one of the two or more unsaturation sites present in the crosslinker take part in the polymerization reaction. The polymers so formed are isolated and show the presence of unsaturated groups. The polymers at this stage are readily soluble in solvents such as N,N' dimethyl formamide, N,N' dimethyl sulphoxide, N,N' dimethyl acetamide and especially water. The polymerization can be carried out in organic solvents like N, N' dimethyl formamide, N,N' dimethyl sulphoxide, chloroform, methanol or aqueous medium using either oil/water soluble initiators depending on the cyclodextrin derivative used. Further, these polymers can be crosslinked in a second step using thermal and/or photochemical initiators either in organic/aqueous media.

The present invention provides inclusion complexes of unsaturated monomers containing multiple unsaturations and a cyclic compound having a general formula A(x)B(y), wherein 'A' is a monomer containing multiple vinyl unsaturation 'x' wherein 0<x<3 and where 'B' is the cyclic host molecule comprising 'y' units, where y=5<y<7. The present invention also provides a process for the preparation of inclusion complexes as above which comprises dissolving a cyclic compound or its derivatives in a solvent at room temperature, adding stoichiometric amount of a monomer containing multiple vinyl unsaturation to this solution and stirring the mixture up to 24-48 hrs, at a temperature in the range 20° C. to 30° C., removing the solvent and recovering the complex under vacuum to obtain the inclusion complex.

The cyclic compound can be a macromolecular organic compound exemplified by cyclodextrin, crown ethers, cryptands, cyclophanes or their derivatives. The cyclodextrin can be α-cyclodextrin, β-cyclodextrin, hydroxypropyl cyclodextrin or methylated cyclodextrin derivative. The monomer containing multiple vinyl unsaturations can be either aliphatic, aromatic or heterocyclic compound, such as bis, acrylamides or methacrylamides as exemplified by Ethylene bis methacrylamide, Methylene bis acrylamide, or can be Propylene bis acrylarnide/Propylene bis methacrylamide, Butylene bis acrylamide/Butylene bis methacrylamide, Phenylene bis acrylamide/Phenylene bis methacrylamide, Tris(2-methacrylamido ethyl) amine or Tris(2-acrylamido ethyl)amine, 2,4, 6-Trimethacrylamido-1,3,5-triazine/2,4,6-Triacrylamido-1, 3,5-triazine, N,N'-(4,7, 10-trioxa tridecamethylene)-bis acrylamide/N,N'-(4,7,10-trioxa tridecamethylene)-bis methacrylamide, N,N'-(4,9-dioxa dodecamethylene)-bis acrylamide/N,N'-(4,9-dioxa dodecamethylene)-bis methacrylamide, 2,4,5,6 tetra-methacrylamido pyrimidine sulfate/2,4, 5,6 tetra-acrylamido pyrimidine sulfate, 4,5,6 tris acrylamido pyrimidine sulfate/4,5,6 tris methacrylamido pyrimidine sulfate.

The solvent used for complex preparation can be water or chloroform depending on the cyclodextrin derivative used.

The polymerization of inclusion complexes results in polymers containing free unsaturated groups and is soluble in aqueous medium as well as in organic solvents. The polymerization of inclusion complexes gives polymers having a general formula [A(x) B(y)]n, wherein x, y and n represents the number of repeating units of monomers and x=0 to 10, y=0 to 10 and n=10 to 1000. The invention provides a process for the preparation of soluble polymers of inclusion complexes, which when prepared by conventional polymerization methods, lead to crosslinked products.

The present invention also provides a process for the preparation of polymers of inclusion complexes by free radical polymerization methods using suitable free radical initiators like thermal, redox or photoinitiators. The inclusion complexes can be polymerized by dissolving in organic solvents or water. The organic solvents used can be N,N' dimethyl formamide, N,N' dimethyl sulphoxide, chloroform, etc. The medium used for polymerization can comprise water also.

The initiators used to carry out polymerization can be thermal, redox or photoinitiators. The thermal initiators used for polymerization can be azo, redox or peroxide initiators as exemplified by azo bis isobutyronitrile, 2,2' azo bis amidino propane dihydrochloride, potassium persulphate, sodium metabisulfite, etc. These thermal initiators used for polymerization can be either oil/water soluble initiators. The oil soluble thermal initiators used for polymerization can be azo bis isobutyronitrile, benzoyl peroxide, t-butyl peroxide, cumyl peroxide, 1,1' azobis cyclohexane carbonitrile. The water soluble thermal and redox initiators used for polymerization can be 2,2' azo bis amidino propane dihydrochloride, sodium metabisulfite-potassium persulphate, etc.

The photoinitiators used for polymerization can be oil or water soluble initiators. The oil soluble photoinitiator used for polymerization can be 1-hydroxy cyclohexyl phenyl ketone. The water soluble photoinitiator used for polymerization can be 2,2' azo bis amidino propane dihydrochloride.

The temperature used for polymerization can be from room temperature to 65° C.

The polymerization can be carried out at room temperature as exemplified by polymerizations carried out in the presence of potassium persulphate/TEMED and potassium persulphate/sodium metabisulphite. The nonsolvents used for the precipitation of homopolymers can be hydrocarbons like pet ether, hexane or ketones like acetone. The above mentioned soluble polymers containing unsaturated groups can be further polymerized using thermal, redox or photoinitiators.

The thermal initiators used for polymerization can be azo, redox or peroxide initiators as exemplified by azo bis isobutyronitrile, 2,2' azo bis amidino propane dihydrochloride, potassium persulphate-sodium metabisulfite, benzoyl peroxide, cumyl peroxide, t-butyl peroxide, etc. These thermal initiators used for polymerization can be either oil/water soluble initiators. The oil soluble thermal initiators used for polymerization can be azo bis isobutyronitrile, benzoyl peroxide, t-butyl peroxide. The water-soluble thermal initiators used for polymerization can be 2,2' azo bis amidino propane dihydrochloride, potassium persulphate, sodium metabisulfite, azobis cyano valeric acid, etc.

The photoinitiators used for polymerization can be oil or water soluble initiators. The oil soluble photoinitiator used for polymerization can be 1-hydroxy cyclohexyl ketone, 2,2'-azobis (2,4-dimethyl valeronitrile), 2,2'-azobis(2-methyl butyronitrile). The water-soluble photoinitiator used for polymerization can be 2,2' azo bis amidino propane dihydrochloride.

The organic solvents used can be N,N' dimethyl formamide, N,N' dimethyl sulphoxide, chloroform, N,N' dimethyl acetamide, etc. The medium used for polymerization can also be aqueous.

The scope of the invention is not restricted to monomers containing multiple unsaturation and cyclodextrin or its derivatives and the compositions of the complexes described above.

Natural polymers such as cellulose, proteins, chitosan, guar gum and synthetic polymers such as polyvinyl alcohol are crosslinked using glutaraldehyde. But, the presence of unreacted crosslinker in the network of gels restricts their application since they are toxic. Hence, there is a need to remove these unreacted crosslinkers from the network of gel in an independent step. Polymers prepared in the presence of cross linkers such as MBAM form gels and are useful in immobilization of enzymes and drug delivery systems but suffer from the same limitation. This problem can be over come if a crosslinker can be made a part of the polymer maintaining the polymer still in a soluble state, the unreacted crosslinker, monomer be completely removed by washing and then the cross linking is brought about after the encapsulation of the active ingredient, especially a labile one such as an enzyme.

This limitation has been overcome in the process of the invention by synthesizing these gels in two steps. In the first step, only one unsaturated site of crosslinker takes part in polymerization and gives solvent soluble polymers with pendent unsaturation. The unreacted crosslinker can be removed at this stage and the polymer contains no free crosslinker, which can be crosslinked to get insoluble gel. Furthermore, the pendent unsaturation can be used to design different polymer architectures.

To protect the second vinyl group of divinyl monomer during the first polymerization step, the divinyl monomer is complexed with cyclodextrin. We report the use of cyclodextrin to form an inclusion complex with the divinyl monomer which prevents the polymerization of the vinyl group incorporated in the cyclodextrin cavity. After the polymerization in the first step, the unsaturated site can be deprotected by removing cyclodextrin. The deprotected vinyl group can now be used for crosslinking process or for copolymerization with different monomers in second step. Upto now, cyclodextrin has been used for dissolution of the hydrophobic monomers or as surfactant in emulsion polymerizations.

The polymerization carried out in the presence of divinyl monomers leads to the formation of gel network. So, in this work we report the use of cyclodextrin to form an inclusion complex with the divinyl monomer, which prevents the polymerization of the vinyl group incorporated in the cyclodextrin cavity. Further, the remaining unsaturated site can be used for crosslinking process or for copolymerization with different monomers in second step.

Following examples are given by way of illustration and should not construed the scope of the invention.

In all the examples given below NMR data indicates the presence of unsaturation in the polymers synthesized.

EXAMPLE 1

This example describes the preparation of β-cyclodextrin-Ethylene bis methacrylamide (EBMA) complex.

11.35 g (0.01 moles) β-cyclodextrin was dissolved in 500 ml distilled water at room temperature. To this, 1.96 g (0.01 moles) Ethylene bis methacrylamide was added in one portion and the mixture was stirred using a magnetic stirrer for 24 hours. A water soluble complex was obtained. Water was evaporated at room temperature. The complex was dried in a desiccator under vacuum. The yield was 95%. The complex was characterized by $^1$H NMR and IR spectroscopy. The stoichiometry of the complex was determined from the area of the protons for β-cyclodextrin and Ethylene bis methacrylamide and found to be 1:1. IR spectroscopic analysis indicated the presence of amide and unsaturation in the complex.

$^1$H NMR (D$_2$O): 1.92 δ CH$_3$ of EBMA, 3.44 δ CH$_2$ of EBMA, 3.55-3.67 δ and 3.85-3.96 δ cyclodextrin peak, 5.66 δ and 5.45 δ =CH$_2$, IR (nujol): 1658 cm$^{-1}$, C=O of EBMA, 1614 cm$^{-1}$ —C=C—, 2854.5, 2924 cm$^{-1}$ —CH$_3$, 1462 cm$^{-1}$ =CH$_2$. The IR peaks of EBMA in EBMA-β-cyclodextrin complex showed shift of 3-8 cm$^{-1}$.

EXAMPLE 2

This example describes the preparation of β-cyclodextrin-Methylene bis acrylamide (MBAM) complex.

11.35 g (0.01 moles) β-cyclodextrin was dissolved in 500 ml distilled water at room temperature. To this, 1.54 g (0.01 moles) Methylene bis acrylamide (MBAM) was added and the mixture was stirred at room temperature for 24 hours. The complex comprising Methylene bis acrylamide and β-cyclodextrin was water soluble. This solution was concentrated to dryness at room temperature and dried in a desiccator under vacuum. The yield was 98%. The complex was characterized by $^1$H NMR and IR spectroscopy. The stoichiometry of the complex was 1:1 as determined by NMR.

$^1$H NMR (D$_2$O): 4.5 δ CH$_2$ of MBAM, 5.43-5.64 δ =CH$_2$, 6.09-6.29 δ =CH of MBAM, 3.55-3.67 δ and 3.85-3.96 δ cyclodextrin peaks.

IR (nujol):1656.7 cm$^{-1}$ C=O of MBAM, 1625.9 cm$^{-1}$ C=C of MBAM, 1463 cm$^{-1}$, 2854.5, 2924 cm$^{-1}$ —CH$_3$, 1462 cm$^{-1}$ =CH$_2$.

EXAMPLE 3

This example describes the preparation of methylated β-cyclodextrin-Ethylene bis methacrylamide (EBMA) complex.

13.31 g (0.01 moles) methylated βcyclodextrin was dissolved in 196 ml distilled water at room temperature. To this, 1.96 g (0.01 moles) Ethylene bis methacrylamide was added and the mixture was stirred at room temperature for 24 hours. The water soluble complex comprising Ethylene bis methacrylamide and methylated β-cyclodextrin was obtained. This solution was concentrated to dryness at room temperature. The complex was dried at room temperature in a vacuum desiccator. The yield was 92%. The complex was characterized by $^1$H NMR and IR spectroscopy. The stoichiometry of methylated β-cyclodextrin and Ethylene bis methacrylamide in the complex was 2:1 as estimated by $^1$H NMR. IR shows the presence of unsaturation and amide group in the complex.

$^1$H NMR (D$_2$O): 1.91 δ CH$_3$ of EBMA, 3.44 δ CH$_2$ of EBMA, 3.39-3.41 δ and 3.57-3.85 δ cyclodextrin peak, 5.67 δ and 5.44 δ =CH$_2$.

IR (nujol): 1658.7 cm$^{-1}$, C=O of EBMA, 1618.2 cm$^{-1}$ —C=C—, 2927.7 cm$^{-1}$ —CH$_3$, 1452 cm$^{-1}$ =CH$_2$. The IR peaks of EBMA in EBMA-β-cyclodextrin complex showed shift of 3-8 cm$^{-1}$.

EXAMPLE 4

This example describes preparation of α-Cyclodextrin-Ethylene bis methacrylamide complex.

0.648 g (0.0005 moles) α-Cyclodextrin was dissolved in 10 ml water. To this 0.098 g (0.0005 moles) Ethylene bis methacrylamide was added and the mixture was stirred at room temperature for 24 hours. The complex obtained was in the form of a clear solution. The solution was concentrated to dryness at room temperature and then dried in a desiccator under vacuum. The yield was 96%. The stoichiometry of the complex obtained was 1:1 as determined by NMR analysis. IR peaks showed the presence of unsaturation as well as amide functionality.

$^1$H NMR (DMSOd$_6$): 3.44 δ CH$_2$ of EBMA, 3.28-3.41 and 3.60-3.79 δ cyclodextrin peak, 5.64 δ and 5.43 δ =CH$_2$ of EBMA.

IR (nujol): 1658 cm$^{-1}$, C=O of EBMA, 1614 cm$^{-1}$ —C=C—, 2854.5, 2924 cm$^{-1}$ —CH$_3$, 1462 cm$^{-1}$ =CH$_2$. The IR peaks of EBMA in EBMA-β-cyclodextrin complex showed shift of 3-8 cm$^{-1}$.

EXAMPLE 5

This example describes preparation of α-Cyclodextrin-Methylene bis acrylamide (MBAM) complex.

0.648 g (0.0005 moles) α-Cyclodextrin was dissolved in 10 ml water. To this, 0.098 g (0.0005 moles) Methylene bis acrylamide was added and the mixture was stirred at room temperature for 24 hours. The complex obtained was in the form of a clear solution. The solution was concentrated to dryness at room temperature and then dried in a desiccator under vacuum. The yield was 96%.

$^1$H NMR (DMSOd$_6$): 1.92 δ CH$_3$ of MBAM, 4.5 δ CH$_2$ of MBAM, 3.55-3.67 δ and 3.85-3.96 δ cyclodextrin peak, 5.66 δ and 5.45 δ =CH$_2$.

IR (nujol): 1658 cm$^{-1}$, C=O of MBAM, 1614 cm$^{-1}$ —C=C—, 2854.5, 2924 cm$^{-1}$ —CH$_3$, 1462 cm$^{-1}$ =CH$_2$. IR peaks of MBAM in MBAM-β-cyclodextrin complex showed shift of 3-8 cm$^{-1}$.

EXAMPLE 6

This example describes preparation of methylated β-cyclodextrin-Methylene bis acrylamide (MBAM) complex.

13.31 g (0.01 moles) methylated β-cyclodextrin was dissolved in 196 ml distilled water. 1.54 g (0.01 moles) Methylene bis acrylamide was added to the solution and the mixture was stirred for 24 hours. The complex was obtained in the form of a clear solution, which was then concentrated at room temperature and then dried in a desiccator under vacuum. The yield of the complex was 92%. The stoichiometry of the complex determined by $^1$H NMR analysis was 1:1 (Methylene bis acrylamide: methylated β-cyclodextrin).

$^1$H NMR (D$_2$O): 4.5δ CH$_2$ of MBAM, 3.39-3.41 and 3.57-3.85δ cyclodextrin peak, 6.1δ and 5.44δ =CH$_2$ and =CH of MBAM.

IR: 1658.7 cm$^{-1}$, C=O of MBAM, 1627.8 cm$^{-1}$ —C=C—, 2927.7 cm$^{-1}$ —CH$_3$, 1452 cm$^{-1}$ =CH$_2$. The IR peaks of MBAM in MBAM-β-cyclodextrin complex showed shift of 3-8 cm$^{-1}$.

EXAMPLE 7

This example describes preparation of hydroxypropyl β-cyclodextrin-Methylene bis acrylamide complex.

1 g (0.0007 mole) hydroxypropyl β-cyclodextrin was dissolved in 2 ml distilled water. 0.1094 g (0.0007 mole) Methylene bis acrylamide was added to the solution and the mixture was stirred for 24 hours. The complex was obtained in the form of a clear solution, which was then concentrated at room temperature and then dried in a desiccator under vacuum. The yield of the complex was 94%. The stoichiometry of the complex was determined by $^1$H NMR was 1:1 (Methylene bis acrylamide: hydroxypropyl β-cyclodextrin).

$^1$H NMR (D$_2$O): 4.5 δ CH$_2$ of MBAM, 3.39-3.41 δ and 3.57-3.85 δ cyclodextrin peak, 6.1δ and 5.44 δ =CH$_2$ and =CH of MBAM.

IR: 1658.7 cm$^{-1}$, C=O of MBAM, 1627.8 cm$^{-1}$ —C=C—, 2927.7 cm$^{-1}$ —CH$_3$, 1452 cm$^{-1}$ =CH$_2$. The IR peaks of MBAM in MBAM-hydroxypropyl β-cyclodextrin complex showed shift of 3-8 cm$^{-1}$.

EXAMPLE 8

This example describes the preparation of Poly (Ethylene bis methacrylamide) in aqueous medium using potassium persulphate.

1 g complex comprising Ethylene bis methacrylamide and β-cyclodextrin as described in example 1 was dissolved in 17 ml distilled water. 10 mg potassium persulphate was added and the test tube was flushed with nitrogen for 10-15 min. The test tube was immersed in a water bath maintained at 65° C. The polymerization was carried out for 24 hours. After cooling, the solution was concentrated at room temperature and then methanol was added to it. Polymer remained in the alcoholic layer and the cyclodextrin precipitate was isolated by filtration. The yield of the polymer was 79%. The polymer obtained was soluble in water, methanol, DMF, DMSO. $^1$H NMR analysis showed presence of vinyl unsaturation even after polymerization. The IR analysis showed the presence of the amide functionality as well as the presence of a double bond.

$^1$H NMR (DMSOd$_6$): 1.95 δ CH$_3$, 3.5 δ CH$_2$ of EBMA, 5.64 δ and 5.43 δ =CH$_2$ of EBMA.

IR (nujol): 1658 cm$^{-1}$, C=O of EBMA, 1614 cm$^{-1}$ —C=C—, 2854.5, 2924 cm$^{-1}$ —CH$_3$, 1462 cm$^{-1}$ =CH$_2$.

Intrinsic Viscosity: [η]=0.06 dl/g

COMPARATIVE EXAMPLE 9

1 g Ethylene bis methacrylamide was dissolved in 17 ml distilled water in a test tube. To this, 10 mg potassium persulphate was added and the test tube was purged with nitrogen for 15 min. The polymerization was carried out at 65° C. The polymer was obtained as a crosslinked gel within 30 min, which was insoluble in common organic solvents like DMF, DMSO, methanol and also in water.

COMPARATIVE EXAMPLE 10

Ethylene bis methacrylamide 0.2 g (0.001 mole) and 1.14 g β-cyclodextrin (0.001 mole) were dissolved in 17 ml distilled water. To this, 5 mg potassium persulphate was added and nitrogen was bubbled for 10 min. The polymerization was carried out at 65° C. The crosslinked gel was obtained within 30 min. This gel was insoluble in DMF, DMSO, methanol and water.

EXAMPLE 11

This example provides the preparation of poly (Methylene bis acrylamide) in aqueous medium using potassium persulphate.

1 g Methylene bis acrylamide-β-cyclodextrin complex as described in example 2 was dissolved in 17 ml distilled water in a test tube. 10 mg potassium persulphate was added as an initiator and the test tube was flushed with nitrogen for 15 min. The polymerization was carried out for 24 hours at 65° C. After cooling, the solution was concentrated at room temperature and then methanol was added to it. Polymer remained in the alcoholic layer and the cyclodextrin precipitated out which was isolated by filtration. The polymer was obtained by precipitating in ether. The yield of the polymer was 75%. The structure was confirmed by $^1$H NMR and IR spectroscopy. $^1$H NMR analysis showed presence of vinyl unsaturation even after polymerization. The IR analysis showed the presence of the amide functionality as well as the presence of double bond. The polymer obtained was soluble in water, methanol, DMF and DMSO.

$^1$H NMR (DMSOd$_6$): 4.5δ CH$_2$ of MBAM, 6.1δ and 5.44δ =CH$_2$ and =CH.

IR (nujol): 1658.7 cm$^{-1}$, C=O of MBAM, 1627.8 cm$^{-1}$ —C=C—, 2927.7 cm$^{-1}$ —CH$_3$, 1452 cm$^{-1}$ =CH$_2$.

Intrinsic Viscosity: [η]=0.054 dl/g

EXAMPLE 12

This example illustrates the crosslinking of poly (EBMA) in water using the photoinitiator 2,2'-azobis (2-amidinopropane) dihydrochloride.

0.1 g Poly (Ethylene bis methacrylamide) prepared according to example 9, was dissolved in 2 ml water and 10 mg photo initiator 2,2'-azobis(2-amidinopropane)dihydrochloride was added. The solution was exposed to UV irradiation for 15 min. The polymer was crosslinked and formed a gel. This is an indirect evidence for the selective polymerization of one vinyl group in the first stage followed by a second stage polymerization leading to crosslinking. The polymer after crosslinking was found to be insoluble in water, DMF, methanol and DMSO.

EXAMPLE 13

This example illustrates the photopolymerization of β-cyclodextrin-Ethylene bis methacrylamide complex.

1 g Ethylene bis methacrylamide/β-cyclodextrin complex prepared as in example 1 was dissolved in 6 ml N,N dimethyl formamide in a test tube. 10 mg 1-hydroxy cyclohexyl phenyl ketone was added and the test tube was flushed with nitrogen for 15 min. The polymerization was carried out for 15 min. at room temperature by exposure to UV irradiation. The polymer solution was concentrated at room temperature and then methanol was added to it. The polymer remains in the alcoholic layer while cyclodextrin was precipitated. Cyclodextrin was separated by filtration and the filtrate was precipitated in diethyl ether. The yield of the polymer was 75%. The polymer was soluble in water, methanol, DMF and DMSO. The structure was confirmed by $^1$H NMR and IR spectroscopy. $^1$H NMR analysis showed the presence of vinyl unsaturation. This was also confirmed by IR spectroscopy.

$^1$H NMR (DMSOd$_6$): 1.95 δ CH$_3$, 3.5 δ CH$_2$ of EBMA, 5.64 δ and 5.43 δ =CH$_2$ of EBMA.

IR (nujol): 1658 cm$^{-1}$, C=O of EBMA, 1614 cm$^{-1}$ —C=C—, 2854.5, 2924 cm$^{-1}$ —CH$_3$, 1462 cm$^{-1}$ =CH$_2$.

EXAMPLE 14

This example provides the preparation of Poly (ethylene bis methacrylamide) at room temperature.

5 g Ethylene bis methacrylamide/β-cyclodextrin complex as described in example 1 was dissolved in 125 ml distilled water in a round bottom flask and it was flushed with nitrogen for 20 min. 50 mg potassium persulphate and 10 ml TEMED was added as an initiator and accelerator respectively. The polymerization was carried out for 24 hours at room temperature. The solution was concentrated at room temperature and then methanol was added to it. Homopolymer remained in the alcoholic layer and the cyclodextrin precipitated was isolated by filtration. The polymer was obtained by precipitating in ether. The yield of the polymer was 47%. The structure was confirmed by $^1$H NMR and IR spectroscopy. $^1$H NMR showed presence of vinyl unsaturation. The IR showed the presence of the amide functionality as well as the presence of double bond. The polymer obtained was soluble in water, methanol, DMF, DMSO.

$^1$H NMR (DMSOd$_6$): 1.95 δ CH$_3$, 3.5 δ CH$_2$ of EBMA, 5.64 δ and 5.43 δ =CH$_2$ of EBMA.

IR (nujol): 1658 cm$^{-1}$, C=O of EBMA, 1614 cm$^{-1}$ —C=C—, 2854.5, 2924 cm$^{-1}$ —CH$_3$, 1462 cm$^{-1}$ =CH$_2$.

EXAMPLE 15

This example provides the preparation of poly (Ethylene bis methacrylamide) from ethylene bis methacrylamide-methylated cyclodextrin complex.

2 g Ethylene bis methacrylamide/methylated cyclodextrin complex as described in example 3 was dissolved in 10 ml distilled water in test tube. 4.3 mg potassium persulphate was added as an initiator and the test tube was flushed with nitrogen for 15 min. The polymerization was carried out for 24 hours at 65° C. After cooling, the solution was concentrated at room temperature and then chloroform was added to it. Methylated cyclodextrin remains in chloroform layer while polymer gets precipitated. The polymer was obtained by precipitating in ether. The yield of the polymer was 63%. The polymer was found soluble in methanol, water, DMF and DMSO. The structure was confirmed by $^1$H NMR and IR spectroscopy. $^1$H NMR showed presence of vinyl unsaturation. The IR showed the presence of the amide functionality as well as the presence of double bond.

$^1$H NMR (DMSOd$_6$): 1.95 δ CH$_3$, 3.5 δ CH$_2$ of EBMA, 5.64 δ and 5.43 δ =CH$_2$ of EBMA.

IR (nujol): 1658 cm$^{-1}$, C=O of EBMA, 1614 cm$^{-1}$ —C=C—, 2854.5, 2924 cm$^{-1}$ —CH$_3$, 1462 cm$^{-1}$ =CH$_2$.

EXAMPLE 16

This example provides the preparation of poly (Ethylene bis methacrylamide) using 2,2' azobis amidino propane dihydrochloride in water at 50° C.

5 g Ethylene bis methacrylamide/β-cyclodextrin complex as described in example 1 was dissolved in 125 ml distilled water in a round bottom flask. 50.2 mg 2,2' azobis amidino propane dihydrochloride was added as an initiator and the flask was flushed with nitrogen for 15 min. The polymerization was carried out for 24 hours at 50° C. After cooling, the solution was concentrated at room temperature and then methanol was added to it. Homopolymer remained in the alcoholic layer and the cyclodextrin precipitated out which was isolated by filtration. The polymer was obtained by precipitating in ether. The yield of the polymer was 70%. This polymer was soluble in methanol, water, DMF, DMSO. The structure was confirmed by $^1$H NMR and IR spectroscopy. $^1$H NMR analysis showed presence of vinyl unsaturation. The IR showed the presence of the amide functionality as well as the presence of double bond.

$^1$H NMR (DMSOd$_6$): 1.95 δ CH$_3$, 3.5 δ CH$_2$ of EBMA, 5.64 δ and 5.43 δ =CH$_2$ of EBMA.

IR (nujol): 1658 cm$^{-1}$, C=O of EBMA, 1614 cm$^{-1}$ —C=C—, 2854.5, 2924 cm$^{-1}$ —CH$_3$, 1462 cm$^{-1}$ =CH$_2$.

EXAMPLE 17

This example describes preparation of Poly (Methylene bis acrylamide) using water-soluble photoinitiator.

0.1 g Poly (Methylene bis acrylamide) was dissolved in 2 ml water. 0.010 g 2,2'azobis (amidinopropane) dihydrochloride was added. This solution was poured into a petri dish to form a film. This film was then exposed to UV radiation for about 12 min. The solubility of the film was then checked in water. The film obtained was insoluble in water, methanol, DMF and DMSO which confirms the crosslinking of the homopolymer of Methylene bis acrylamide.

$^1$H NMR (DMSOd$_6$): 4.5δ CH$_2$ of MBAM, 6.1δ and 5.44δ =CH$_2$ and =CH.

IR (nujol): 1658.7 cm$^{-1}$, C=O of MBAM, 1627.8 cm$^{-1}$ —C=C—, 2927.7 cm$^{-1}$ —CH$_3$, 1452 cm$^{-1}$ =CH$_2$.

EXAMPLE 18

This example provides the preparation of poly (Ethylene bis methacrylamide) in aqueous medium using redox initiator.

2 g Ethylene bis methacrylamide-methylated cyclodextrin complex was dissolved in 20 ml water. 0.0175 g potassium persulphate and 0.01235 g sodium metabisulphite was added to that. Nitrogen gas was purged through the reaction mixture for 10 min. The reaction was carried out at room temperature for 24 hours. Then, the solution was evaporated to dryness. The solid obtained was dissolved in chloroform so that cyclodextrin remained in chloroform layer while polymer was precipitated. The precipitate of the polymer was dried at room temperature. The yield of the polymer was 91%.

$^1$H NMR (DMSOd$_6$): 1.95 δ CH$_3$, 3.5 δ CH$_2$ of EBMA, 5.64 δ and 5.43 δ =CH$_2$ of EBMA.

IR (nujol): 1658 cm$^{-1}$, C=O of EBMA, 1614 cm$^{-1}$ —C=C—, 2854.5, 2924 cm$^{-1}$ —CH$_3$, 1462 cm$^{-1}$ =CH$_2$.

EXAMPLE 19

This example provides the preparation of poly (Ethylene bis methacrylamide) in chloroform.

2 g Ethylene bis methacrylamide-methylated cyclodextrin complex was dissolved in 20 ml chloroform. 0.005 g azo bis isobutyronitrile was added to that. Nitrogen gas was purged through the reaction mixture for about 10 min. The solution was refluxed for 5 hrs at 60° C. It was seen that the polymer get precipitated in chloroform. The precipitated polymer was filtered and dried at room temperature. The yield of the polymer was 90%.

$^1$H NMR (DMSOd$_6$): 1.95 δ CH$_3$, 3.5 δ CH$_2$ of EBMA, 5.64 δ and 5.43 δ =CH$_2$ of EBMA.

IR (nujol): 1658 cm$^{-1}$, C=O of EBMA, 1614 cm$^{-1}$ —C=C—, 2854.5, 2924 cm$^{-1}$ —CH$_3$, 1462 cm$^{-1}$ =CH$_2$.

EXAMPLE 20

This example provides the preparation of poly (Methylene bis acrylamide) from hydroxypropyl β-cyclodextrin-Methylene bis acrylamide complex.

1.1094 g Methylene bis methacrylamide-hydroxypropyl β-cyclodextrin complex was dissolved in 12 ml N,N' dimethyl formamide. 0.01 g azo bis isobutyronitrile was added. Nitrogen gas was purged through the reaction mixture for about 10 min. The polymerization was carried out for 24 hours at 65° C. The polymer was precipitated in acetone, filtered and dried at room temperature. The yield of the polymer was 78%.

$^1$H NMR (DMSOd$_6$): 4.5δ CH$_2$ of MBAM, 6.1δ and 5.44δ =CH$_2$ and =CH.

IR (nujol): 1658.7 cm$^{-1}$, C=O of MBAM, 1627.8 cm$^{-1}$ —C=C—, 2927.7 cm$^{-1}$ —CH$_3$, 1452 cm$^{-1}$ =CH$_2$.

We claim:

1. A water soluble polymer containing free pendent unsaturation prepared by polymerization of a water soluble inclusion complex having general formula A(x)B(y), wherein 'A' is a monomer containing 'x' number of vinyl unsaturations, wherein 1<x<3 and is an integer, said monomer selected from the group consisting of bis acrylamide/methacrylamide, ethylene bis acrylamide/ethylene bis methacrylamide, methylene bis acrylamide/methylene bis methacrylamide, propylene bis acrylamide/propylene bis methacrylamide, butylene bis acrylamide/butylene bis methacrylamide and phenylene bis acrylamide/phenylene bis methacrylamide, and B is a cyclic host molecule comprising 'y' units, wherein 5<y<7, wherein B is selected from the group consisting of α cyclodextrin, β cyclodextrin, dimethyl β cyclodextrin and hydroxypropyl β cyclodextrin.

2. A polymer as claimed in claim 1, wherein the monomer is selected from methylene bis acrylamide and ethylene bis methacrylamide.

3. A polymer as claimed in claim 1, wherein B is selected from β cyclodextrin and dimethyl β cyclodextrin.

* * * * *